M. H. DUDLEY.
PIPE JOINT.
APPLICATION FILED MAR. 31, 1910.

993,661.

Patented May 30, 1911.

Mathew H. Dudley, Inventor

UNITED STATES PATENT OFFICE.

MATHEW HOUSTAN DUDLEY, OF LYNCHBURG, VIRGINIA, ASSIGNOR OF ONE-HALF TO HENRY E. McWANE, OF LYNCHBURG, VIRGINIA.

PIPE-JOINT.

993,661. Specification of Letters Patent. Patented May 30, 1911.

Application filed March 31, 1910. Serial No. 552,735.

*To all whom it may concern:*

Be it known that I, MATHEW H. DUDLEY, a citizen of the United States, residing at Lynchburg, in the county of Campbell and State of Virginia, have invented a new and useful Pipe-Joint, of which the following is a specification.

It is a well known fact that the joints used in connection with gas pipes cannot be made gas-tight, and as a result great loss is experienced by gas companies through the leakage of gas under the ground. It has been estimated that such loss is fully twenty per cent. The present method of making pipe joints with lead and jute renders the joint so rigid that when the pipe line settles, the joint leaks by reason of its nonflexibility. The old style bell and spigot joint, as well as the bolted joint, do not allow for expansion and contraction due to variation in temperature.

The object of this invention is to devise a lead joint in which the pipes can be deflected sidewise, or up and down several inches, and can expand and contract without causing any leakage, and in which a uniform quantity of lead will be given all around the joint, these results being achieved without making the joint complex in construction or difficult of operation. These objects, and such other objects as will hereinafter incidentally appear, are attained in the construction illustrated in the accompanying drawings, and the invention consists in certain peculiar features of the same which will be hereinafter first fully described and then particularly pointed out in the claims.

Figure 1:
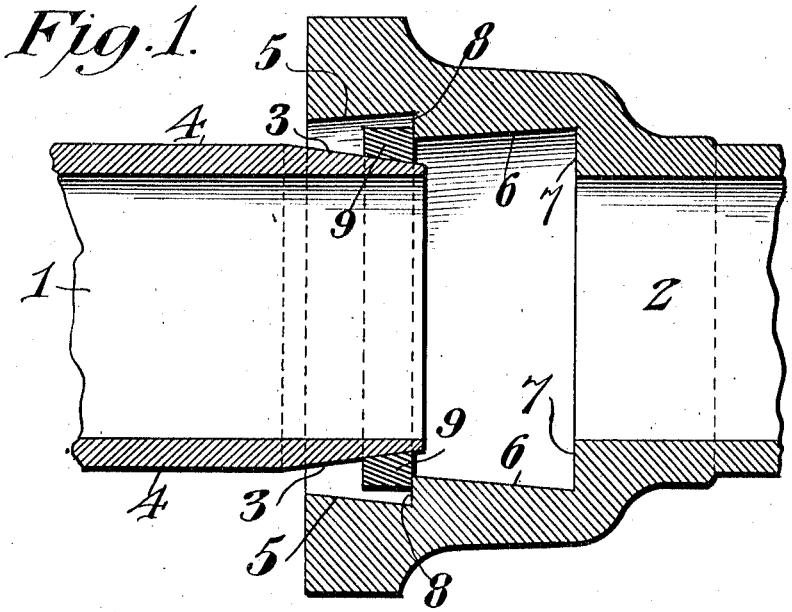
Figure 2:
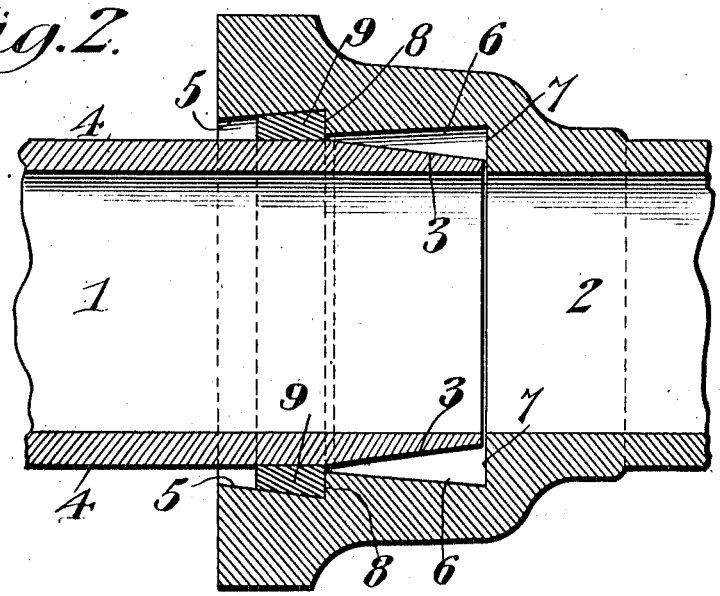

In the drawings, Figure 1 is a longitudinal section of a pipe joint showing the parts in their proper relative positions but not finally assembled. Fig. 2 is a similar view showing the parts as they appear when the joint has been completed.

The pipes are constructed in any of the well-known methods so as to present a male member 1 and a female member 2, the male member having a tapered end, as indicated at 3, and having its walls parallel, adjacent to and leading from the said tapered portion, as shown at 4. The female member is provided with internal tapered grooves 5 and 6, with the wide end of the groove 5 in the same radial plane as the narrow end of the groove 6, thereby presenting internal shoulders 7 and 8, respectively, disposed radially with respect to the axis of the pipe. The diameter of the inner groove 6, at the edge of the shoulder 8, is approximately equal to or only slightly greater than the external diameter of the straight portion of the male member, while the diameter of the outer groove 5, at the mouth or outer end of the same, is greater than the diameter of the smaller end of the groove 6 and of the external diameter of the male member, this being for a purpose which will hereinafter appear. The length of the tapered portion or end 3 of the male member should be less than the length of the groove 6 of the female member, so that when the male member is finally driven home and the straight portion 4 is within the ring 9, the end of the male member will be spaced slightly from the shoulder 7. A ring 9, of some durable and expansible or compressible material such as lead, is employed and this ring, in its initial condition, has its outer wall cylindrical, while the inner wall is conical. The external diameter of the ring 9 is in its initial condition slightly less than that of the smaller end of the groove 5 so that the ring may be inserted in the groove to ultimately engage the shoulder at the base of the latter. The inner periphery of the ring in its initial condition conforms to the tapered portion of the male member so that the thin end of the latter may readily enter the ring snugly, whereby the seating of the male member in the female member will expand the ring outwardly against the wall of the groove 5. The mass of the ring is such that when the ring is expanded the elongation of the ring is less than the length of the groove 5, so that a slight open space will be left at the mouth of the said groove.

In assembling the parts, the expansible ring 9 is inserted in the outer groove 5 and the male member of the joint is then inserted through the ring, as indicated in Fig. 1, in which figure it will be noted that the ring is out of contact with the wall of the outer groove and is engaged evenly and throughout its inner surface by the tapered end of the male member. The male member is then driven home so that the straight surface 4 thereof will be within the ring 9 and will then bear against the inner wall thereof, and this forcing of the male member into position will expand the ring against the wall of the groove, so that the parts will assume the position shown in Fig. 2. In practice, the internal diameter of the ring is such as to allow the extremity of the tapered end of the male member to enter the ring, and it follows that the remaining portion of said tapered end, as well as the straight surface or cylindrical part of the male member, has a diameter in excess of the internal diameter of said ring.

It will be readily appreciated from the foregoing description, taken in connection with the accompanying drawings, that when the male member is inserted into the female member and driven home, the ring will be firmly lodged in the groove 5 between the two joint members, thereby forming a tight packing by which leakage will be positively prevented. It will also be noted that the packing engages the straight portion of the outer surface of the male member and that the tapered portion or end of the said member rests within the taper groove 6 in the female member so that deflection of the members relatively to each other may occur when the pipe line settles without, in any way, loosening the joint or opening up seams therein which will permit leakage. This flexibility of the device, furthermore, is assured by reason of the fact that the diameter of the outer groove in which the packing is seated, at the mouth of the said groove, is greater than the external diameter of the male member, so that the outer surface of the said member will not be in contact with the edge or wall of the groove in the normal position of the parts. It will also be noted that the expansion and contraction of the parts, due to changes in temperature, will be permitted and will not cause any diminution in the intimate contact between the several parts so that the packing ring will, at all times and in all positions, effectually prevent leakage. Furthermore, the forcing of the male member through the expansible ring will expand the same equally in all directions, so that the two members will be perfectly centered at each joint and there will be a uniform quantity of packing all around the joint.

I prefer to use lead as the packing material, but it will be readily understood, of course, that rubber or other elastic material may be used, or the packing may be composed of a combination of lead and rubber, the exact nature of the packing being determined by the amount of pressure the joint will ordinarily be expected to withstand in any particular application of the invention. In all cases, however, the packing will be in the form of a previously-prepared solid ring, capable of slipping over the end of the male member, or being inserted in the groove 5 of the female member. The width of the packing ring in its expanded state is less than the width of the groove so that there is a free space around the male member at the mouth of the groove to accommodate the deflection of the member.

This joint has been tested under a pressure of four hundred pounds per square inch, and it has been found to hold perfectly tight.

Having thus described the invention, what I claim as new, and desire to secure by Letters Patent, is:—

1. A pipe joint comprising a male member having the outer wall at the end tapering and back of the tapered portion said member being cylindrical, a female member formed with two alined grooves, the outer groove being of less length than the inner groove and tapering toward the receiving end of the female member, the larger or inner end of the outer groove being of greater diameter than the outer end of the inner groove so as to define an annular shoulder at the juncture of the two grooves, and the combined length of the two grooves being sufficient to allow the tapered end of the male member to pass into and be received within the inner groove and the cylindrical portion of the male member to extend through the outer groove, the diameter of the inner groove being greater than the external diameter of the tapered end of the male member, and a ring of expansible, solid material adapted to be fitted in the outer groove, and having its external diameter less than the said groove, and its internal diameter less than the cylindrical portion of the male member, said ring being adapted to be forced, by the insertion of the male member through the ring, into intimate contact with the walls of the outer tapered groove and against the said annular shoulder.

2. A pipe joint comprising a male member having the outer wall at the end tapering and back of the tapered portion said member being cylindrical, a female member formed with two alined tapered grooves, both grooves tapering toward the receiving end of the female member, the larger end of the outer groove being of greater diameter than, and arranged in the same radial plane as the smaller end of the inner groove, thereby defining a shoulder at the juncture of the two grooves, the combined length of the two grooves being sufficient to receive the tapered end of the male member with the cylindrical portion thereof extending through the outer groove, the diameter of the inner groove being greater than the external diameter of the tapered end of the male member, and a ring of solid expansible material smaller in external diameter than and adapted to be fitted in the outer groove and having its internal diameter less than the cylindrical portion of the male member, said ring being adapted to be forced, by the insertion of the male member, into intimate contact with the walls of the outer groove and against the said shoulder.

In testimony, that I claim the foregoing as my own, I have hereto affixed my signature in the presence of two witnesses.

MATHEW HOUSTAN DUDLEY.

Witnesses:
W. W. COFFEY,
T. W. WALSH.